(12) United States Patent
Krause et al.

(10) Patent No.: US 7,595,116 B2
(45) Date of Patent: *Sep. 29, 2009

(54) PROCESS FOR IMPROVING THE DURABILITY, DIMENSIONAL STABILITY AND SURFACE HARDNESS OF A WOOD BODY

(75) Inventors: Andreas Krause, Goettingen (DE); Holger Militz, Bovenden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 190 days.

This patent is subject to a terminal disclaimer.

(21) Appl. No.: 10/529,901

(22) PCT Filed: Oct. 1, 2003

(86) PCT No.: PCT/EP03/10874

§ 371 (c)(1),
(2), (4) Date: Oct. 4, 2005

(87) PCT Pub. No.: WO2004/033170

PCT Pub. Date: Apr. 22, 2004

(65) Prior Publication Data

US 2006/0194901 A1    Aug. 31, 2006

(30) Foreign Application Priority Data

Oct. 4, 2002    (DE) ................................ 102 46 401

(51) Int. Cl.
*B32B 23/04*    (2006.01)
(52) U.S. Cl. ........................ 428/532; 428/533; 428/535; 428/536; 428/537.1; 427/440; 422/32; 524/391; 524/597; 528/254; 528/259
(58) Field of Classification Search ............... 428/532, 428/533, 535, 536, 537.1; 427/440; 422/32; 524/391, 597; 528/254, 259
See application file for complete search history.

(56) References Cited

U.S. PATENT DOCUMENTS

| 4,005,039 | A | * | 1/1977 | Gardiner ..................... 524/391 |
| 4,396,391 | A | * | 8/1983 | North ............................. 8/181 |
| 4,908,238 | A | | 3/1990 | Vigo et al. |
| 5,384,012 | A | | 1/1995 | Hazard, Jr. |

FOREIGN PATENT DOCUMENTS

| SE | 500 039 | 3/1994 |
| WO | 97/36720 | 10/1997 |
| WO | 98/29393 | 7/1998 |

OTHER PUBLICATIONS

Militz, H.: Treatment of timber with water soluble dimethylol resins to improve their dimensional stability and durability Wood Science and Technology, vol. 27, pp. 347-355, 1993.
Ellis, W. D.; O'Dell, L. J.: Wood-Polymer Composites Made with Acrylic Monomers, Isocyanate, and Maleic Anhydride, Journal of Applied Polymer Science, vol. 73, pp. 2493-2505, 1999.

* cited by examiner

*Primary Examiner*—Leszek Kiliman
(74) *Attorney, Agent, or Firm*—Oblon, Spivak, McClelland, Maier & Neustadt, P.C.

(57) ABSTRACT

A process for improving the durability, dimensional stability and surface hardness of a wood body is described, in which an untreated wood body is impregnated with an aqueous solution of
A) an impregnating agent from the group consisting of 1,3-bis(hydroxymethyl)-4,5-dihydroxyimidazolidin-2-one, 1,3-bis(hydroxymethyl)-4,5-dihydroxyimidazolidin-2-one modified with a $C_{1-5}$-alcohol, a polyol or mixtures thereof, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea or mixtures thereof and
B) a catalyst from the group consisting of metal or ammonium salts, organic or inorganic acids and mixtures thereof, and wood and impregnating agent are then caused to react while maintaining humid conditions at elevated temperature.

26 Claims, No Drawings

US 7,595,116 B2

PROCESS FOR IMPROVING THE DURABILITY, DIMENSIONAL STABILITY AND SURFACE HARDNESS OF A WOOD BODY

The invention relates to a process for the production of a wood body having high durability, dimensional stability and surface hardness, in which an untreated wood body is impregnated with an aqueous solution of A) an impregnating agent from the group consisting of 1,3-bis(hydroxymethyl)-4,5-dihydroxyimidazolidin-2-one, 1,3-bis(hydroxymethyl)-4,5-dihydroxyimidazolidin-2-one modified with a $C_{1-5}$-alcohol, a polyol or mixtures thereof, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea or mixtures thereof, and B) a catalyst from the group consisting of the metal or ammonium salts, organic or inorganic acids or mixtures thereof, and then hardened while maintaining humid conditions at elevated temperature.

The invention relates in particular to wood bodies of relatively large dimensions. A wood body is understood as meaning a shaped body of solid wood. The wood body and the impregnating agent are intended to give, so to speak, a composite material in which the positive properties of the natural material wood, in particular the appearance, are retained, but one or more physical and biological properties are substantially improved.

From the publication "Treatment of timber with water soluble dimethylol resins to improve the dimensional stability and durability", in Wood Science and Technology 1993, pages 347-355, it is known that the shrinkage and swelling properties of wood and the resistance to fungi and insects can be improved by treating the wood with an impregnating agent which consists of an aqueous solution of dimethyloldihydroxyethyleneurea (DMDHEU or 1,3-bis(hydroxymethyl)-4,5-dihydroxyimidazolidin-2-one) and a catalyst. Catalysts used are metal salts, citric acid and amine salts, individually or in combination. The DMDHEU is used in the aqueous solution in concentrations of from 5% to 20%. The added amount of catalyst is 20%, based on the DMDHEU. The impregnation is effected under reduced pressure. At elevated temperature, a reaction of the DMDHEU with itself and with the wood takes place. This reaction takes place in the course of one hour in a drying oven at temperatures of 80° C. or 100° C. The wood samples thus treated exhibit an improvement of up to 75% in the shrinkage and swelling properties, and do so at DMDHEU concentrations of 20%. Wood bodies having dimensions of 20 mm×20 mm ×10 mm were investigated in this manner. The process described can be used only in the case of small dimensions of the wood bodies because the timbers treated tend to crack in the case of larger dimensions.

From the publication by W. D. Ellis, J. L. O'Dell, "Wood-Polymer Composites Made with Acrylic Monomers, Isocyanate and Maleic Anhydride", published in Journal of Applied Polymer Science, Vol. 73, pages 2493-2505 (1999), it is known that natural wood can be treated with a mixture of acrylates, isocyanate and maleic anhydride under reduced pressure. The substances used react with themselves but not with the wood. By means of such an impregnation, the density, the hardness and the resistance to water vapor diffusion increase. Furthermore, the water repellency and the dimensional stability of the wood are improved.

EP-B 0 891 244 discloses the impregnation of wood bodies of solid wood with a biodegradable polymer, a natural resin and/or a fatty ester—if appropriate with the application of reduced pressure and/or superatmospheric pressure. The impregnation is effected at elevated temperatures. The pores in the wood are at least substantially filled, and a shaped body which comprises both wood and biodegradable polymer forms. A reaction of the polymer with the wood does not take place. The characteristic properties of wood, the biodegradability and the mechanical properties are not lost with this treatment. The thermoplasticity can be increased. Depending on the proportion of polymer introduced, there is an increase in the surface hardness due to the incorporation of the polymer into the wood matrix, so that timbers naturally soft are also suitable for high quality floors.

SE-C 500 039 describes a process for hardening wood with compression, in which untreated wood is impregnated with various aminoplast monomers based on melamine and formaldehyde by means of vacuum pressure impregnation, then dried, and hardened in a press with compression at elevated temperature. Inter alia, DMDHEU, dimethyllourea, dimethoxymethylurea, dimethylolethyleneurea, dimethylolpropyleneurea and dimethoxymethylurone are mentioned as crosslinking agents.

This process has the disadvantage of an energy-consumptive drying step. Moreover, the natural wood structure is lost as a result of the compression.

It was the object of the invention to provide a process for improving the durability, dimensional stability and surface hardness of a wood body, also having relatively large dimensions, which process does not have the disadvantages of the prior art, in particular leads to no cracking in the wood, and gives wood bodies in which the natural wood structure is preserved.

The object of the invention is achieved, according to the invention, by the process described at the outset. The wood bodies produced by this process are suitable for various advantageous potential applications wherever wood is exposed to moisture and weathering, in particular when used as squared-timber window sections, facade boards or staircase steps.

The process of the present invention is concerned with improving a plurality of properties of wood bodies having relatively large dimensions, for example having a width of from 30 to 200 mm and a thickness of from 30 to 100 mm. In the impregnation of the untreated wood with the impregnating agents A) and, if appropriate, C) and subsequent hardening by the process according to the invention, surprisingly no cracking occurred, not even in the case of relatively large dimensions of the wood bodies. Such an impregnation with subsequent hardening simultaneously improves the durability, dimensional stability and surface hardness of the wood body.

Suitable impregnating agents A) for wood bodies are 1,3-bis(hydroxymethyl)-4,5-dihydroxyimidazolidin-2-one, 1,3-bis(hydroxymethyl)-4,5-dihydroxyimidazolidin-2-one modified with a $C_{1-5}$alcohol, a polyol or mixtures thereof, 1,3-dimethyl-4,6-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea or mixtures thereof.

1,3-Bis(hydroxymethyl)-4,5-dihydroxyimidazolidin-2-one or 1,3-bis(hydroxymethyl)-4,5-dihydroxyimidazolidin-2-one modified with a $C_{1-5}$-alcohol, a polyol or mixtures thereof, or mixtures thereof, are particularly suitable. A very particularly suitable impregnating agent A) is 1,3-bis(hydroxymethyl)-4,5-dihydroxyimidazolidin-2-one modified with a $C_{1-5}$-alcohol, a polyol or mixtures thereof.

Modified 1,3-bis(hydroxymethyl)-4,5-dihydroxyimidazolidin-2-one (mDMDHEU) is disclosed, for example, in U.S.

Pat. No. 4,396,391 and WO 98/29393. They are reaction products of 1,3-bis(hydroxymethyl)4,5-dihydroxyimidazolidin-2-one with a $C_{1-5}$alcohol, a polyol or mixtures thereof.

Suitable $C_{1-5}$alcohols are, for example, methanol, ethanol, n-propanol, isopropanol, n-butanol and n-pentanol, methanol being preferred.

Suitable polyols are ethylene glycol, diethylene glycol, 1,2- and 1,3-propylene glycol, 1,2-, 1,3- and 1,4-butylene glycol, glycerol and polyethylene glycols of the formula $HO(CH_2CH_2O)_nH$, where n is from 3 to 20, diethylene glycol being preferred.

For the preparation of the derivatives of 1,3-bis(hydroxymethyl)-4,5-dihydroxyimidazolidin-2-one (mDMDHEU), DMDHEU and the monohydric alcohol and/or the polyol are mixed, the monohydric alcohol and/or the polyol being used in an amount of from 0.1 to 2.0 mole equivalents each, based on DMDHEU. The mixture of DMDHEU, monohydric alcohol and/or polyol is reacted at temperatures of from 20 to 70° C. and a pH of from 1 to 2.5, the pH being brought to 4 to 8 after the reaction.

Suitable impregnating agents C) are $C_{1-5}$-alcohols, polyols or mixtures thereof, such as, for example, methanol, ethanol, n-propanol, isopropanol, n-butanol, n-pentanol, ethylene glycol, diethylene glycol, 1,2- and 1,3-propylene glycol, 1,2-, 1,3- and 1,4-butylene glycol, glycerol, polyethylene glycols of the formula $HO(CH_2CH_2O)_nH$, where n is from 3 to 20, or mixtures thereof.

Methanol, diethylene glycol and mixtures thereof are preferred.

The impregnating agents A) and, if appropriate, C) are used, in a concentration of from 1 to 60% by weight, preferably from 10 to 40% by weight, based on the aqueous solution of the impregnating agent.

If the impregnating agent C) is concomitantly used, from 1 to 50% by weight, based on the impregnating agent A) is preferred.

Suitable catalysts B) are metal salts from the group consisting of metal halides, metal sulfates, metal nitrates, metal tetrafluoroborates, metal phosphates or mixtures thereof. Examples are magnesium chloride, magnesium sulfate, zinc chloride, lithium chloride, lithium bromide, boron trifluoride, aluminum chloride, aluminum sulfate, zinc nitrate, sodium tetrafluoroborate or mixtures thereof.

Suitable catalysts B) are also ammonium salts from the group consisting of ammonium chloride, ammonium sulfate, ammonium oxalate, diammonium phosphate or mixtures thereof.

Further suitable catalysts B) are organic or inorganic acids. Suitable examples are maleic acid, formic acid, citric acid, tartaric acid, oxalic acid, p-toluenesulfonic acid, hydrochloric acid, sulfuric acid, boric acid or mixtures thereof.

Magnesium chloride, zinc chloride, magnesium sulfate and aluminum sulfate are preferably used.

Magnesium chloride is particularly preferred.

In the process of the present invention, the impregnation can be carried out under the action of reduced pressure with subsequent action of pressure. The wood body is exposed to reduced pressure of from 10 to 100 mbar for a period of from 10 minutes to 2 hours, preferably about 30 minutes, depending on the dimensions of the wood body, in an impregnating unit and then flooded with the impregnating agent. Reduced pressure of about 50 mbar for about one hour has proven advantageous. Alternatively, however, the wood body can first be flooded with the impregnating agent in the impregnating unit and then exposed to reduced pressure from 10 to 100 mbar for the abovementioned period.

Pressures of from 2 to 20 bar, preferably from 10 to 12 bar, depending on the dimensions of the wood body, for a period of from 10 minutes to 2 hours, preferably about one hour, are then allowed to act. The vacuum pressure process is expedient particularly in combination with high proportions by weight of the impregnating agent.

After the pressure phase, the residual liquid is removed and the impregnated wood body is hardened without intermediate drying. It is particularly important to maintain humid conditions during the hardening of the impregnating agent so that drying during this reaction is thus avoided. The impregnating agent introduced into the wood is thus caused to react with itself and with the wood under humid conditions and while avoiding drying. In this context, humid conditions means a water content of the wood above the fiber saturation point, which may be about 30% of water in the wood, depending on the type of wood. As a result of the impregnation, the wood can absorb up to 200% of aqueous impregnating agent.

In order to ensure humid conditions during the hardening, the impregnated wood body is stored in a drying chamber which can be controlled via atmospheric humidity, temperature and pressure and fixed so that warping is counteracted. At a relative humidity of from 40 to 100%, preferably from 50 to 100%, particularly preferably from 80 to 100%, and a temperature of from 70 to 130° C., preferably from 80 to 100° C., the impregnated wood body is hardened over a period of from 1 to 72 hours, preferably from 1 to 48 hours, depending on the dimensions of the wood body, the impregnating agents A) and, if appropriate, C) reacting with the wood and with themselves. Maintaining a relative humidity above 40%, preferably above 50% and particularly preferably above 80 to 100% serves for avoiding drying of the wood body below the fiber saturation point during the hardening.

A person skilled in the art would in any case have dried the impregnated wood body prior to hardening because he would otherwise have expected cracking of the wood body. Thus, the surprising aspect of the present invention is that the wood body does not tend to crack even without prior drying. This applies in particular to wood bodies having relatively large dimensions, for example having a width of from 30 to 200 mm and a thickness of from 30 to 100 mm.

After the hardening, the wood bodies are dried, warping of the wood being counteracted by suitable means and the physical data measured.

USE EXAMPLE 1

Squared-timber window sections were produced from *Pinus radiata*, i.e. profiled bodies which can be used in the production of window frames.

DMDHEU modified with diethylene glycol and methanol (mDMDHEU) is diluted to 30% by weight with water and mixed with 1.5% of $MgCL_2 . 6H_2O$. The wood bodies dried to about 12% wood moisture content were introduced into an impregnating unit. The impregnating unit was subjected to a reduced pressure of 40 mbar absolute for 30 minutes. Flooding of the impregnating unit with the impregnating agent was then effected. The reduced pressure of 50 mbar absolute was kept constant. A pressure of 10 bar was then applied for 2 hours. The pressure phase was terminated and the residual liquid was removed.

The wood bodies were then stored in a drying chamber controllable via temperature and atmospheric humidity and fixed so that warping was impossible. The chamber was brought to 95° C. and a relative humidity of about 95%. These humid conditions were maintained until a temperature of at least 90° C. was reached for 48 hours in the interior of the wood bodies.

The subsequent drying of the wood bodies was carried out on a well ventilated wood stack. The squared-timber sections were then further processed.

Swelling and shrinkage of the treated squared-timber sections:

The edges thus treated were distinguished by greatly reduced swelling and shrinkage on changes in atmospheric humidity (dimensional stability) compared with the untreated squared-timber sections.

TABLE 1

| Wood type | Swelling from 0% atmospheric humidity to 96% atmospheric humidity | Relative improvement |
|---|---|---|
| Untreated pine sapwood | 13.6% | |
| Treated pine sapwood | 7.5% | 45% |

The advantage of such a treatment for use in window construction is that the formation of open joints which form as a result of swelling and shrinkage and in the long term lead to the destruction of the window is reduced and the life of wooden windows is thus increased.

In addition, the wood is protected from abiotic degradation by UV light and/or rainwater.

This was investigated on pine sapwood in outdoor weathering.

It is clearly evident that the abovementioned treatment has led to a substantial improvement in the resistance to weathering. Thus, considerably reduced cracking, substantially reduced graying and substantially less erosion on the wood surface are observable.

USE EXAMPLE 2

Here, round pine posts were treated so that palisades can be erected therewith.

DMDHEU was diluted to about 15% by weight with water and mixed with 0.75% of $ZnNO_3 \cdot 6\,H_2O$. The round wood bodies dried to about 20% wood moisture content and having about the same dimensions were introduced into an impregnating unit. This impregnating unit was flooded with the impregnating agent and subjected to a reduced pressure of 40 mbar absolute for 30 minutes. A pressure of 10 bar was then applied for 2 hours. The pressure phase was terminated and the residual liquid was removed. The wood bodies were then stored in a drying chamber controllable via temperature and atmospheric humidity and fixed so that warping was impossible. The drying chamber was brought to 98° C. and a relative humidity of about 80%. The conditions were maintained until a temperature of at least 95° C. was reached for 30 hours in the interior of the wood bodies. The wood bodies were then dried on a well ventilated wood stack in the open air.

Durability of the Treated Test Specimens:

The resistance to soft rot (contact with earth) is very important with regard to the durability of palisades. Particularly important is the resulting loss of strength, for example the decline in the modulus of elasticity.

TABLE 2

| Wood | Modulus of elasticity at start of test | Modulus of elasticity after 32 weeks | Decline in modulus of elasticity | Mass loss |
|---|---|---|---|---|
| Untreated | 8309 N/mm² | 4096 N/mm² | 51% | 18% |
| Treated | 8419 N/mm² | 8272 N/mm² | 2% | 2% |

This test was carried out according to ENv807. The samples were subject to degradation during contact with earth, under conditions optimized for the organisms.

USE EXAMPLE 3

Boards of rubberwood were treated in order to produce garden furniture or garden decks therefrom.

DMDHEU modified with diethylene glycol and methanol (mDMDHEU) was diluted to 40% by weight with $H_2O$ and mixed with 2% by weight of $Al_2(SO_4)_3 \cdot 16\,H_2O$. The boards dried to about 12% by weight wood moisture content were introduced into an impregnating unit. This was flooded with the impregnating agent and subjected to a reduced pressure of 40 mbar absolute for 1 hour. A pressure of 10 bar was then applied for 2 hours. After the end of the pressure phase, the residual liquid was removed.

The shaped bodies were heated in a saturated water vapor atmosphere to about 90° C. This was achieved by packing the wood bodies in foil which remains stable at this temperature. The duration of the temperature application was dependent on the type of wood and the dimensions of the wood bodies. In the case of 3 to 6 cm thick wood bodies, the reaction time was about 48 hours.

After the reaction, the wood was fixed in stacks so that warping was made impossible. There followed a drying process at a temperature of about 50° C. and for a duration of 14 days. It was possible to use a conventional drying chamber for this purpose.

Durability of the Wood Bodies Thus Treated:

Wooden garden utensils (furniture or decks) which are not subjected to contact with earth undergo degradation by certain fungi and abiotic weathering. The degradation by wood-destroying fungi was investigated in a manner comparable to EN 113:

TABLE 3

| Wood | Mass loss after 8 weeks |
|---|---|
| Untreated | 34% |
| Treated | 1% |

USE EXAMPLE 4

Here, staircase steps of solid wood, for example beech, were produced. These steps had dimensions of 1000 mm×400 mm×80 mm. Particular value was placed on increased surface hardness of the staircase steps.

DMDHEU was diluted in a commercial aqueous solution to 60% by weight with $H_2O$ and mixed with 1.5% by weight of $MgCl_2 \cdot 6\,H_2O$. The staircase steps dried to about 12% wood moisture content and having about the same dimensions were introduced into an impregnating unit which was flooded with the impregnating agent. In the impregnating unit, a reduced pressure of 40 bar absolute was established for 1 hour. The impregnating unit was then brought to below a pressure of 10 bar for 2 hours. After the end of the pressure phase, the residual liquid was removed.

The staircase steps were heated in a water-saturated atmosphere to about 95° C. The duration of the temperature application was dependent on the type of wood and the dimensions of the steps. In the case of steps having a thickness of 80 mm, the reaction time was about 60 hours.

After the reaction, the wood was fixed in stacks so that warping was made impossible. There followed a drying process at a temperature of about 50° C. and for a duration of 14 days. A conventional drying chamber was used for this purpose.

Surface hardness of wood samples thus treated:

The surface hardness of the wood samples was determined by means of the Brinell hardness method EN 1534.

TABLE 4

| Wood | Brinell hardness | Improvement |
|---|---|---|
| Untreated | 35 N/mm$^2$ | |
| Treated | 112 N/mm$^2$ | 220% |

We claim:

1. A process for the production of a wood body, comprising impregnating an untreated wood body with an aqueous solution of
   A) an impregnating agent selected from the group consisting of 1,3-bis(hydroxymethyl)-4,5-dihydroxyimidazolidin-2-one, 1,3-bis(hydroxymethyl)-4,5-dihydroxyimidazolidin-2-one modified with a $C_{1-5}$-alcohol, a polyol or mixtures thereof, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea and mixtures thereof, and
   B) a catalyst selected from the group consisting of the metal salts, ammonium salts, organic acids, inorganic acids and mixtures thereof, and
   hardening the wood body impregnated with the aqueous solution while maintaining humid conditions at elevated temperature.

2. The process as claimed in claim 1, wherein the impregnating agent used is A) 1,3-bis(hydroxymethyl)-4,5-dihydroxyimidazolidin-2-one, 1,3-bis(hydroxymethyl)-4,5-dihydroxyimidazolidin-2-one modified with a $C_{1-5}$- alcohol, a polyol or mixtures thereof.

3. The process as claimed in claim 1 wherein the impregnating agent used is A) 1, 3-bis(hydroxymethyl)-4,5-dihydroxyimidazolidin-2-one modified with a $C_{1-5}$-alcohol, a polyol or a mixture thereof.

4. The process as claimed in claim 1, wherein an impregnating agent C) selected from the group consisting of a $C_{1-5}$- alcohol, a polyol and mixtures thereof is concomitantly used.

5. The process as claimed in claim 4, wherein methanol, ethanol, n-propanol, isopropanol, n-butanol, n-pentanol, ethylene glycol, diethylene glycol, 1,2- and 1,3-propylene glycol, 1,2-, 1,3- and 1,4-butylene glycol, glycerol, polyethylene glycols of the formula HO(CH$_2$ Ch$_2$O)$_n$H, where n is from 3 to 20, or mixtures thereof are concomitantly used.

6. The process as claimed in claim 5, wherein methanol, diethylene glycol or a mixture thereof is concomitantly used.

7. The process as claimed in claim 1, wherein the impregnating agents A) and, optionally C) are used in a concentration of from 1 to 60% by weight in the aqueous solution.

8. The process as claimed in claim 1, wherein metal salts selected from the group consisting of metal halides, metal sulfates, metal nitrates, metal tetrafluoroborates, metal phosphates and mixtures thereof are used as catalyst B).

9. The process as claimed in claim 8, wherein metal salts selected from the group consisting of magnesium chloride, magnesium sulfate, zinc chloride, lithium chloride, lithium bromide, boron trifluoride, aluminum chloride, aluminum sulfate, zinc nitrate, sodium tetrafluoroborate and mixtures thereof are used as catalyst B).

10. The process as claimed in claim 1, wherein ammonium salts selected from the group consisting of ammonium chloride, ammonium sulfate, ammonium oxalate, diammonium phosphate and mixtures thereof are used as catalyst B).

11. The process as claimed in claim 1, wherein organic or inorganic acids selected from the group consisting of maleic acid, formic acid, citric acid, tartaric acid, oxalic acid, p-toluenesulfonic acid, hydrochloric acid, sulfuric acid, boric acid and mixtures thereof are used as catalyst B).

12. The process as claimed in claim 1, wherein magnesium chloride is used as catalyst B).

13. The process as claimed in claim 1, wherein the catalyst B) is used in a concentration of from 0.1 to 10% by weight, based on the amount of the impregnating agents A) and, optionally, C).

14. The process as claimed in claim 1, wherein the impregnated wood body is hardened at a relative humidity of from 50 to 100%.

15. The process as claimed in claim 14, wherein the impregnated wood body is hardened at a relative humidity of from 80 to 100%.

16. The process as claimed claim 1, wherein the impregnated wood body is hardened at a temperature of from 70 to 130° C.

17. The process as claimed in claim 1, wherein the impregnated wood body is hardened over a period of from 1 to 72 hours.

18. The process as claimed in claim 1, wherein after the impregnation, the wood body is fixed so that a change in the shape of the wood body during the hardening is counteracted.

19. A wood body , obtained by the process as claimed in claim 1.

20. A process for the production of a wood body, comprising
   impregnating an untreated wood body with an aqueous solution of
   A) an impregnating agent selected from the group consisting of 1,3-bis(hydroxymethyl)-4,5-dihydroxyimidazolidin-2-one, 1,3 -bis(hydroxymethyl)-4,5-dihydroxyimidazolidin-2-one modified with a $C_{1-5}$-alcohol, a polyol or mixtures thereof, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea and mixtures thereof,
   B) a catalyst selected from the group consisting of the metal salts, ammonium salts, organic acids, inorganic acids and mixtures thereof,
   C) an impregnating agent selected from the group consisting of a C1-5-alcohol, a polyol, and mixtures thereof, and water, and
   hardening the wood body impregnated with the aqueous solution while maintaining humid conditions at elevated temperature.

21. A wood body, obtained by the process as claimed in claim 20.

22. The process according to claim 1, wherein the impregnating agent A) is 1,3-bis(hydroxymethyl)-4,5-dihydroxy-imidazolidin-2-one modified with methanol.

23. The process according to claim 1, wherein the impregnating agent A) is 1,3-bis(hydroxymethyl)-4,5-dihydroxy-imidazolidin-2-one modified with diethylene glycol.

24. The process according to claim 1, wherein the impregnating agent A) is 1,3-bis(hydroxymethyl)-4,5-dihydroxy-imidazolidin-2-one modified with a mixture of methanol and diethylene glycol.

25. The process according to claim 1, wherein the impregnated wood body is hardened at a relative humidity of from 50 to 100% at a temperature of from 70 to 130° C.

26. The process according to claim 1, wherein the impregnated wood body is hardened at a relative humidity of from 80 to 100% at a temperature of from 80 to 100° C.

* * * * *